Figure 1:
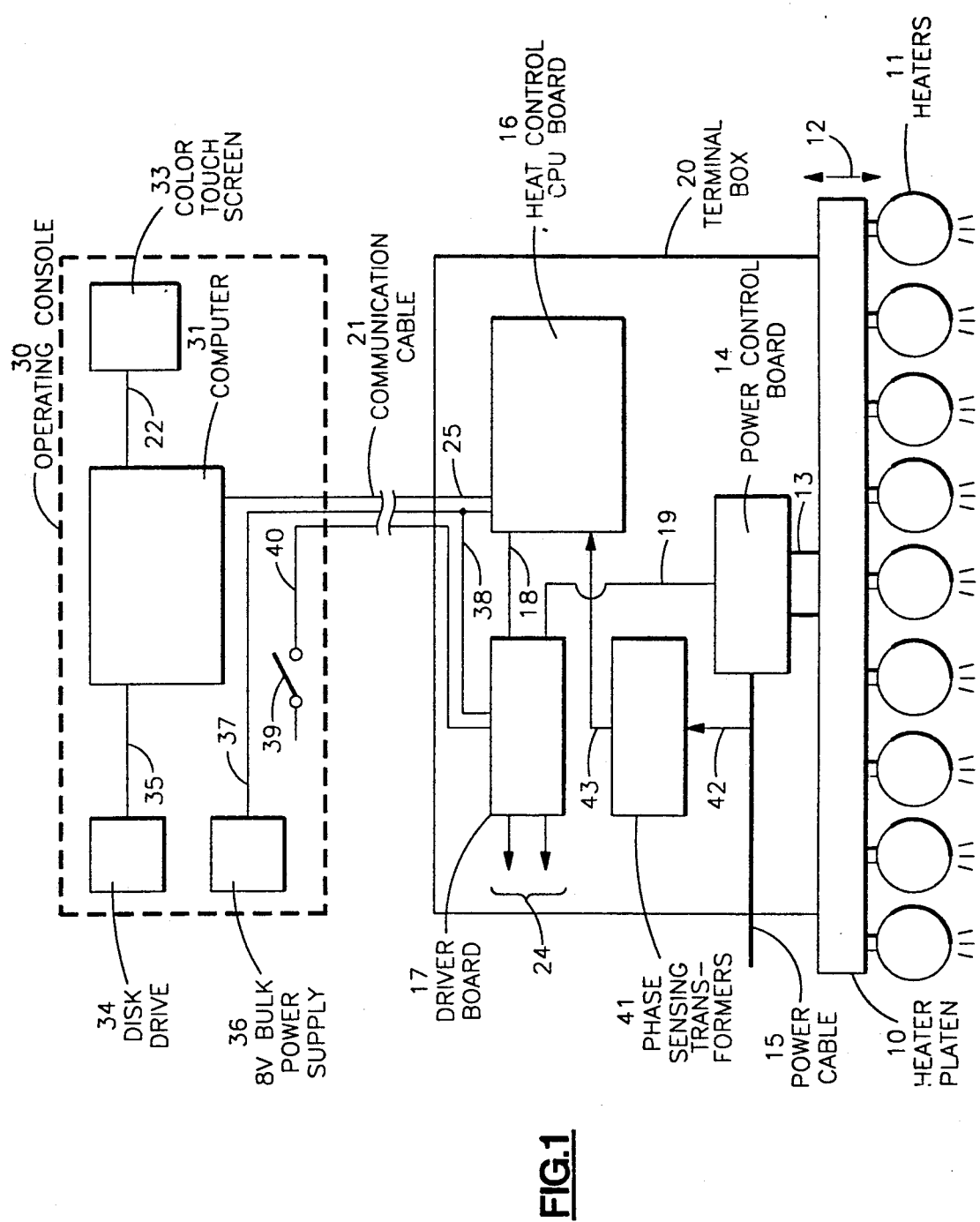

United States Patent [19]
Ekendahl et al.

[11] Patent Number: 5,280,434
[45] Date of Patent: Jan. 18, 1994

[54] HEATING SYSTEM FOR THERMOFORMING

[75] Inventors: Lars Ekendahl, Hebron, Conn.; Philip Barber, Windham; John Churchill, Hollis, both of N.H.

[73] Assignee: Thermoforming Technologies, Inc., Seabrook, N.H.

[21] Appl. No.: 724,103

[22] Filed: Jul. 1, 1991

[51] Int. Cl.⁵ ............................ G06F 15/46; H05B 1/02
[52] U.S. Cl. ..................................... 364/492; 364/188; 364/505; 364/477; 340/588
[58] Field of Search ............... 364/492, 188, 505, 473, 364/477, 476; 340/588, 640, 644, 718

[56] References Cited

U.S. PATENT DOCUMENTS

| | | | |
|---|---|---|---|
| 4,630,221 | 12/1986 | Heckenbach et al. | 364/505 |
| 4,672,558 | 6/1987 | Beckes et al. | 340/718 |
| 4,749,992 | 6/1988 | Fitzemeyer et al. | 340/870.02 |
| 4,807,144 | 2/1989 | Joehlin et al. | 364/473 |
| 4,825,199 | 4/1989 | Antilozi | 340/640 |
| 4,897,230 | 1/1990 | Gross | 425/141 |
| 4,916,628 | 4/1990 | Kugler | 364/492 |
| 5,005,116 | 4/1991 | Fujita et al. | 364/476 |
| 5,053,604 | 10/1991 | Escaravage et al. | 219/483 |

Primary Examiner—Thomas G. Black
Assistant Examiner—Michael Zanelli
Attorney, Agent, or Firm—Lee A. Strimbeck

[57] ABSTRACT

A programmable computer-controlled fast response infrared heating system capable of precise individual zone control and especially useful for thermoforming of plastic sheets comprises an array of fast response quartz heaters on a platen, a terminal box having a CPU and mounted on and moving with the platen and which needs only one power line to it and which distributes the power to the heaters sequentially on a milli-second time basis with an essentially constant power output to each heater. The power is three phase and switching occurs only when the voltage over a relay is zero to minimize RFI/EMI emissions. The CPU is interfaced with a general purpose computer at the operator's console and a touch activated display showing the percent of available power being supplied to each heater. The operator by touch command can change the percentage of applied power for any one heater or the total power supplied to the whole of the array. The need to use a heavy umbilical cord of a multiplicity of power lines to the heater platen is obviated.

12 Claims, 2 Drawing Sheets

HEATING SYSTEM FOR THERMOFORMING

This invention pertains to a programmable fast response heating system capable of precise individual zone control and is more particularly concerned with an infrared heating temperature control system such as may be used in plastic thermoforming or like industrial operations.

INTRODUCTION

In the repetitive thermoforming of plastic sheets, especially those of large size as used in the manufacture of automobiles, each sheet should desirably be brought up to the forming temperature as rapidly as possible to minimize cycle time. Different areas of the part may be required to be at different temperatures and/or the energy input required may vary substantially from one area to another.

Control of the heating in thermoforming has been exasperating in the past, especially when fast cycle times are desired. It has been difficult to reduce or eliminate operator error because of the skill or "feel" an operator has had to develop unique for each part being manufactured and the difficulty of maintaining the operator level of performance during the tedium of forming part after part. Each operator may vary the process according to his whims which leads to non-uniform product quality or output.

Besides loss of material, power consumption often is needlessly high as the equipment is left on when it does not need to be to avoid the waste of time to again bring it up to operating temperature and to avoid inconsistent heating patterns.

THIS INVENTION

This invention is a programmable computer controlled fast response infrared heating system especially useful for thermoforming. From the operator's viewpoint, it has a unique but simple touch activated color display monitor combining monitoring and command functions that allow the operator to perform setup, changeover and other processing activities quickly and easily with the touch of a finger. Once a program is established, it can be locked in to prevent changes from operator to operator and the program can be readily transferred to several other like machines for production runs.

Each screen clearly displays system status and manufacturing information and presents a menu of system commands that can be activated by simply touching the appropriate screen area. These commands provide access to setup, diagnostic and file maintenance features of the system and create a natural intuitive flow of operator activities from one screen to the next.

The heater platen has an array of fast response quartz heaters that reach operating temperature within 5 to 10 seconds eliminating costly and time consuming oven preheating. Any of the individual heaters on the platen can be selected and changed or the entire platen can be raised or lowered by the same heat offset value. The heat intensity values are conveniently displayed on the operator's monitor numerically and may be displayed in different colors, for example, for each 5% range of values.

Each heating zone of the array, usually a single heater, has its own solid state relay. Each relay is operated digitally sequentially on a milli-second time basis to provide essentially a constant heat output from each zone. For all practical purposes, the resistance heaters appear to be continually on at the predetermined or desired percent of power set by the operator. For any one heater or zone, the heat output does not fluctuate or disconcertingly go on and off. The power switching occurs at zero voltage crossing points eliminating most electromagnetic and radio frequency interference and providing power factors close to one. Heater inputs are automatically adjusted to maintain constant output levels over line voltage fluctuations. The result is consistent performance under conditions that would cause process variations in other systems.

As the power is alternately applied to the heaters in rapid sequence, this prevents all of the heaters from being energized simultaneously. The power is three phase and is lead leveled on a phase by phase basis. This time domain multiplexing technique greatly reduces the overall peak power requirement and minimizes the power surges often found in other systems. As the system has a very fast response, it may readily be shut down or lowered to a reduced power setting during the periods when it is inactive.

Machine status and operational performance are continuously evaluated by the system during the manufacturing process. Any faults that might occur are detected in areas associated with system power, mechanical function, control circuitry, computer hardware and computer software execution. Faults are immediately displayed on the monitor screen and can be recorded in the systems' error log. Messages are also displayed that assist in fault correction.

In brief compass, this invention is a programmable fast response heating system comprising: a heater having an array of individual electric heating elements on a support or platen. A terminal box is carried by the support and has a power control board having a solid state relay for controlling the power to each heating element or selected zone of two or more heating elements. A single power cable to the power control board in the terminal box supplies power to each relay. This is to be contrasted to prior constructions where a power line for each heater had to be attached to the platen as an umbilical cord grouping several power cords and moving with the platen. This bulky heavy umbilical cord construction was necessarily stiff and subject to breakage with repetitive flexing. In the present invention, besides a single power line to the terminal box, only a relatively thin and flexible communications cable need be carried by the terminal box and platen.

The power control board has a solid state relay for each heater or zone operated by a driver board, which in turn, is controlled by a central processing unit (CPU). The terminal box CPU is interfaced with a second computer at the operator's station. The second computer is any general purpose computer with software.

The second computer commands the percent of available power to be provided each heating element and relays and receives feedback on the status of the heating system. A simple computer program operates the second computer. As previously noted, the operator's console has a touch activated display interacting with the second computer and computer program and displays for each zone of the array the percentage of the power available to that section that is then being supplied to that zone, which display may be in color.

The computer program effects a change in the power supplied to any one of the zones in response to a command from the touch activated display and/or adjusts the power supplied to the whole of the array on a percentage change basis.

Usually three phase 220 volt or higher power will be supplied by the power cable. A particular feature of this invention is that the terminal box computer effects the operation of any one relay only during the instant when the voltage over the relay contact is zero thereby substantially reducing potential RFI/EMI emissions. Switching is done sequentially on a milli-second basis and the power output to any one heating element is for all practical purposes constant. The CPU and computer program allow each load to be supplied with power with a short cycle time thereby smoothing heat output. With mechanical equipment, cycle times are necessarily several seconds causing undesirable fluctuations in heat output per heater.

In most thermoforming operations, the heating platen is movable toward and away from the object being heated during each cycle. The platen while often flat can be curved or otherwise shaped to conform to the shape of the part being manufactured.

The terminal box computer monitors the voltage of the power supplied by the power cable and maintains the same power output to the array despite fluctuations in the line voltage. In addition, it samples the current to each of the zones of the array so as to be able to detect heater wiring or an open relay failure. It is also operative to detect a shorted relay and prevents uncontrolled power being supplied to any one zone or heater.

The operator console computer can in a known manner have the capability of "recipe" storage of heating programs of various parts. Any one recipe that has been developed can be, of course, down loaded to a standard floppy diskette or the like and transferred to other machines performing the same operation. Such a recipe can be locked to prevent operator tampering. This is considered to be a notable feature of the present invention. A development department having worked out a processing program can transfer it to production with the knowledge that operators will not be able to fiddle with the recipe and cause variations in product quality.

The heart of this invention may be said to reside in the terminal box moving with the platen and requiring only one power lead. This terminal box may have application to other industrial operations requiring like power control. From a broader prospective, therefore, this invention is an apparatus for distributing and regulating electric power to a series of loads and comprising in combination:

a. a relay series of at least 24 solid state relays;
b. a load series providing one load for each solid state relay;
c. a three phase power source operatively connected to each solid state relay with each solid state relay receiving only one phase thereof; and
d. a central processing unit operatively connected to the relay series and adapted to activate each solid state relay on a milli-second sequencing basis to supply power to each load as a predetermined percent of the power available thereto.

In a preferred embodiment, as previously described, the load series is an array of resistance heaters. The number of relays as explained infra is preferably at least 48.

THE DRAWINGS

Figure 2:
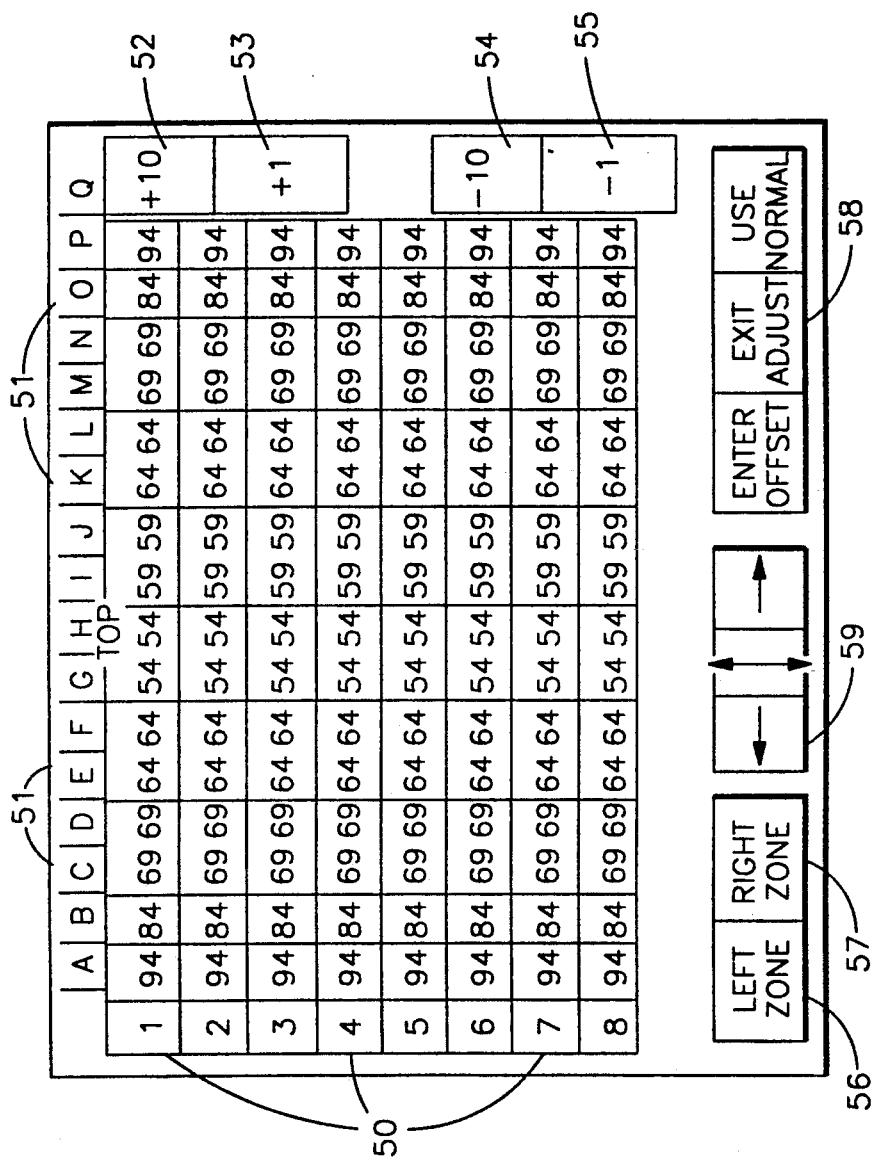

In the drawings:

FIG. 1 schematically illustrates the component parts of the heating system of this invention; and FIG. 2 is a view of the monitor screen illustrating the control of the power supplied to each individual zone of the heating platen.

DESCRIPTION

Referring to the drawings, shown is a heater platen 10 on which is mounted a terminal box 20 which communicates by communications cable 21 to an operator's console 30.

Heater platen 10 has an array of heating elements 11. The heating elements radiate heat on a part to be thermoformed (not shown). The platen is movable toward and away from the part as indicated by direction arrows 12.

The heating array may consist of up to one hundred ninety-two elements or zones; e.g., one hundred twenty-eight fast response quartz heaters, such as those manufactured by Pearlco Infra-Red, Ltd. of London, England and identified as Models PQE-5, PQE-10 or 500 watt square and Thermal Quarz-Schmeize of Wiesbaden, Germany and identifed as Models FS and FSK. These quartz heaters for the purposes this example may be arranged in eight rows of sixteen columns.

The individual quartz heaters are wired by lines 13 to a power control board 14 in terminal box 20, which power control board has an array of relays corresponding to the heater array. The relays, Model No. OACM-UJ, are manufactured by Potter & Blumfield of Princeton, Ind. A power cable 15 supplies power to board 14 and is connected to each individual relay. The relays are all operated by a driver board 17, which in turn is connected to a central processing unit or computer 16 in terminal box 20. Driver board 17 connects to board 16 by line 18 and to board 14 by line 19. There may be one to four or more driver boards 17 per system. Lines 24 can connect driver board 17 to additional driver/power control board sets.

The CPU 16 connects with a computer 31 in console 30 by line 25 using the standard industry RS422 interface. The operator's console computer 31 can be any general purpose computer with software such as an IBM PC or John Fluke Manufacturing Company, Inc., Model 1711A/AA Computer. It may have a floppy disk drive connected to it by line 35 in a known manner.

Computer 31 has a color touch screen or monitor 33 interfaced with it by line 22. One screen display is shown in FIG. 2. The monitor can be, for example, a John Fluke Model 1051.

The system shown can simultaneously operate one, two or more platens 10 by simply providing for the operator to call up on the screen the information about the particular platen to be checked or controlled. The console has an eight volt bulk power supply 36 connecting to the heat control CPU board 16 and driver board 17 by lines 37 and 38 respectively through communications cable 21. This is a known feature to prevent loss of computer function if there should be a power interruption. The operator console also has a metallic emergency shutoff switch 39 connecting to driver board 17 by line 40 through communications cable 21.

Power cable 15 may supply 208/240/480 volt three phase alternating current. Three power sensing transformers 41 connecting to the power supply by line 42 provides information on the state of the power supply by line 43 to the CPU board 16. CPU board 16 automatically compensates for variations of voltage supply to maintain the same power output to heaters 11.

SOFTWARE FEATURES

The heat control CPU board 16 receives its commands via an industry standard RS422 communications line 21. Based on the recipe loaded and operator touch screen inputs, the console computer issues "plain English" commands to the CPU to set each individual zone power. Using a lookup table, the CPU takes these power requests and adjusts each one to a corrected power, based on the reading of that zone's phase voltmeter. This corrected power is expressed by a number that can range from 0 to 128, each count representing 1/128 duty cycle. The corrected power is used as an entry to a second lookup table, which contains a table 128 elements long for each possible value of corrected power. This table is binary, with each element being either zero or one. Each element corresponds to one half cycle of the incoming line frequency and operates the solid state zone relay in its predetermined sequence of bits. The table is constructed by a separate program (not part of the standard, shipped software) with the following rules:

1. Maximize the repeat frequency for smooth heat delivery; i.e., 50% power is two cycles on, two off repeated 64 times instead of 64 on, 64 off.
2. Positive and negative half cycles to be as evenly balanced as possible so no DC component is drawn from the AC line. Patterns with an even number of half cycles on are divided evenly between positive and negative half cycles; patterns with an odd number may have an imbalance of only one half cycle. Different unbalanced patterns are constructed evenly divided between positive half cycle imbalance and negative half cycle imbalance.
3. All conduction patterns are at least two half cycles long to enable the use of inexpensive current sensing transformers (used for open circuit and shorted relay detection).

A control transformer is connected to each line phase and its output applied to zero crossing detectors on the CPU board. This allows the microprocessor to synchronize its commands for each zone to its line phase. After the appropriate pattern for a given zone is selected, the phase powering that zone is determined. The pattern is then clocked out serially, with each successive bit output for the next phase zero crossing.

Because recipes often have the same power setting for multiple zones, and hence the same on/off pattern, it is possible that many zones would be turned on and off simultaneously. This is undesirable because it causes high peak power demand (a problem with traditional mechanical cycle timer systems). To alleviate this, different zones "enter" the bit pattern at different points; i.e., zone 1 running at 30% power might start with the first bit of the pattern and circulate from there; zone 2 running the same 30% power would run the same pattern but start at bit 19. These entry offsets are chosen to smooth demand.

HARDWARE

Terminal box hardware is divided into three physical pieces to enable ease of machine construction, wiring, diagnostics and service. It also allows machines with either a small or large number of zones to be built cost effectively.

The CPU board 16 provides all of the calculation and control functions. One CPU (in current configuration) may control from one to one hundred ninety-two zones. It connects to one to four driver board/power control board pair, each of which has provisions for 48 zones. The connection is via a small ribbon cable, allowing the driver/power board pair to be distributed around the machine in close proximity to the heaters. This minimizes heater wiring. The driver board is separate from the power control board to allow it to be mounted with its LED zone indicators visible with the power control mounted internally and additionally, to allow future new power control boards with improved or higher power relays to be used without CPU or driver board changes. Forty-eight zones per board was chosen because it is divisible by 3 to allow equal zones per phase, and divisible by 8 to suit the digital 8 bit byte communication scheme. While any multiple of 24 was possible, 48 was chosen as a reasonable compromise between the minimum 24 which would result in a higher installed cost for high zone count machines, and 96, 144 or 192 which would be expensive in small systems.

Because updating up to 64 zones (192 zones total divided between 3 phases) exactly at each zero crossing would be burdensome, common properties of commercially available solid state relays are exploited. Unless specifically specified otherwise, solid state relays are zero voltage turn on, zero current turn off devices. With a resistive load (heaters) this means the turn off is also zero voltage. Thus, a relay will not turn on exactly when commanded, but wait for the next line zero voltage crossing. Once turned on, it will not turn off until the next zero crossing. Thus, the relay itself provides a low EMI system. However, since the timing scheme used to control power must be accurate to one half cycle for the desired control accuracy, the CPU actually issues the turn on or turn off command near the peak of the cycle prior to one in which the command action is desired. The relay, whether on or off, will not act on the command until the next zero crossing. Thus, the relay itself performs the exact zero voltage timing. As long as the CPU command is sufficiently far from a zero crossing (30 degrees typical), the relay will perform in this fashion. Thus, a window of 120 degrees typical (180 degrees half cycle—30 degrees at each end) is available for CPU commands. Within this window, the relay is guaranteed to operate on the command at the next zero crossing. This gives the CPU a wide latitude to issue the 64 zone commands. To establish the timing, the CPU uses the phase reference transformers and performs a line frequency calculation periodically.

Referring to FIG. 2, as can be seen in this particular example where there are 128 heating elements, the elements and the screen display are arranged in eight rows (50), 1-8 of sixteen columns (51), A-P. Each square thus provided identifies a particular heat element. The number displayed, say at C-3, "69" indicates the percentage of available power being supplied to that element at that time. By simple touch command, if the operator wishes to change the power to element C-3, all he has to do is highlight the C-3 box using cursor locators 59 and then go over to the right and touch one of the command blocks 51, 52, 53, or 54 at Column 0 to decrease or increase the power in increments of one percent (52, 55) or more rapidly, in increments of ten percent (53, 54). Further, the whole of the power to the array can be percentage wise increased or decreased at 58 and if desired, this may be done by groups of zones such as left side or right side (56, 57).

The color display of the monitor corresponding to increments of the percentage of power being supplied does of course visually and more rapidly give the operator a feel for the state of the heater platen.

Monitoring of the power line voltage and control of the power output is done by the terminal box computer without more. However, the status of the power may be displayed on the monitor. Also, as previously stated, the terminal box computer can monitor each individual heater and each relay and if there should be a malfunction, the malfunction can be instantaneously displayed on the monitor screen such as by having the appropriate box flash on and off.

For a platen designed to accommodate many different thermoforming shapes the whole of the platen may at times not be required to be used. As a setup and control feature, the shape of the part can be outlined on the monitor screen and this will help the operator to visualize which heaters need to be cut out and where the zones, usually at the edges, of higher power will be required.

What is claimed is:

1. Apparatus for distributing and regulating three phase electric power to a series of loads, comprising in combination:
    a. a relay series of solid state relays the number thereof being a whole integer evenly divisible by 3 and 8;
    b. a load series providing one load for each of said solid state relays;
    c. a three phase power source operatively connected to each of said solid state relays with each of said solid state relays receiving only one phase thereof; and
    d. a central processing unit operatively connected to said relay series and adapted to (1) activate each of said solid state relays on a millisecond sequencing basis to supply power to each of said loads at a predetermined power level, (2) maximize repeat frequency for smooth power delivery, (3) substantially balance positive and negative half cycles and (4) keep all power cycles at least two half cycles long.

2. The apparatus of claim 1 wherein said solid state relays turn on only when the load voltage is zero and turn off only when the load current is zero.

3. The apparatus of claim 2 wherein said load series is an array of resistance heaters.

4. A heating system comprising:
    a heater having a series of individual electric heating elements on a support: said series being arranged in an array of zones;
    the following being carried by said support,
        i. a power control board having a series of solid state relays, one for each said zone with each relay being electrically connected to supply power to one of said zones;
        ii. a first computer actively connected to said power control board to individually turn each of said solid state relays on and off;
    a power cable to said power control board connecting to each of said solid state relays and adapted to supply three phase power thereto with only one phase thereof being supplied to any one solid state relay; and
    a control console remote from said support and comprising:
        i. a second computer interfaced with said first computer and adapted to command the amount of power to be supplied to each said zone through said first computer by controlling the amount of times each of said relays will be on and off;
        ii. a computer program operating said second computer; and
        iii. a touch activated display interacting with said second computer and computer program displaying for each said zone of said array the amount of power being supplied to that zone,
    said first computer and said second computer operating digitally on a millisecond time basis to operate sequentially each said solid state relays and thus provide essentially constant power output to each of said zones.

5. The heating system of claim 4 including a driver board carried by said support for receiving commands from said first computer and operatively connected to operate each said solid state relays in response to said commands from said first computer.

6. The heating system of claim 4 wherein the number of said relays is a whole number evenly divisible by 3 and by 8.

7. The heating system of claim 4 including three phase sensing transformers located on said support, for connecting to said power cable and providing output to said first computer and wherein said solid state relays operate by time domain multiplexing and only at zero voltage crossing points.

8. The heating system of claim 7 wherein said first computer:
    a. monitors the voltage of the power supplied by said power cable and maintains the same power output to said array despite fluctuation in the voltage of the power supplied;
    b. samples current to each said zone to detect heater failure; and
    c. is operative to detect a failure of any one of said solid state relays.

9. The heating system of claim 4 including means for moving said support to and away from an object being heated and wherein said array of zones is on a flat platen and wherein each said zone contains only one quartz heater as the heating element.

10. The heating system of claim 4 wherein aid touch activated display is operative by operator touch to command said second computer to change the percent power supplied to any one of said zones by inserting a new value for that zone or by a relative change in the previous setting, and to change the overall power supplied to said array.

11. The heating system of claim 4 wherein said first computer maximizes the repeat frequency for smooth heat delivery, substantially balances positive and negative half cycles, and keeps all power cycles at least two half cycles long.

12. The heating system of claim 4 wherein said second computer provides recipe storage and loading permitting heating system programs to be readily retrieved, repeated or transferred to other like systems, wherein said touch activated display illustrates said array of zones and wherein said second computer can be commanded to show the shape of the object to be heated on said touch activated display.

* * * * *